(No Model.)
F. J. COLE.
BICYCLE BRAKE.
No. 540,637. Patented June 11, 1895.
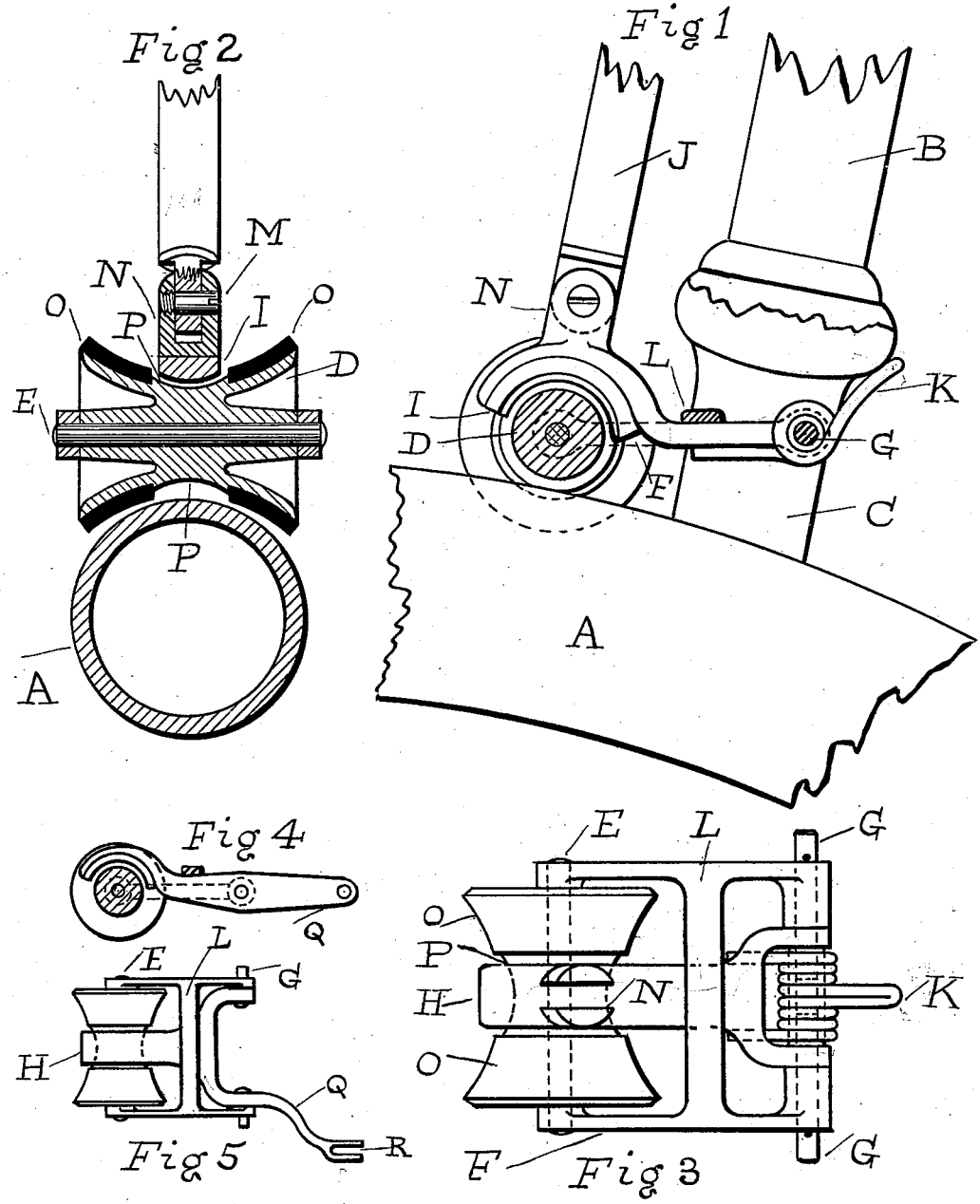
WITNESSES:
Oliver C. Cromwell
Arthur E. Cole
Francis John Cole
INVENTOR.

UNITED STATES PATENT OFFICE.

FRANCIS JOHN COLE, OF BALTIMORE, MARYLAND.

BICYCLE-BRAKE.

SPECIFICATION forming part of Letters Patent No. 540,637, dated June 11, 1895.

Application filed October 18, 1894. Serial No. 526,324. (No model.)

*To all whom it may concern:*

Be it known that I, FRANCIS JOHN COLE, of Baltimore city, State of Maryland, have invented a new and useful Improvement in Bicycle-Brakes, of which the following is a full, clear, and exact description.

The object of this invention is to produce a simple and efficient roller brake for bicycle tires, consisting mainly of an improvement in the roller, which prevents it from being caught fast, and slid flat, or worn out of round by being locked or prevented from revolving. The uneven wear of the roller is a common defect in this style of brake.

It also consists of a very simple and efficient arrangement, for carrying and retarding the motion of the roller.

Referring to the drawings, Figure 1 represents a portion of the front of a bicycle with my improved brake attached thereto in sectional elevation. Fig. 2 represents a sectional front view through the axis of the roller, the bicycle-tire also appearing in section. Fig. 3 represents a general plan of the brake mechanism. Fig. 4 represents a modified form of my improved brake, so that it can be applied by pulling up the vertical rod. Fig. 5 is a plan of the same.

In Figs. 1 to 5, A is the bicycle tire.

B is a bicycle head, or portion of frame.

C is one of the forks of the bicycle between which the wheel carrying the tire A is located, the outer fork being removed to show the brake mechanism more clearly.

D is the roller.

E is the roller pivot.

F is the roller-frame, pivoted between the forks C with the pivot pin G.

H is the brake block holder, provided with the brake block or rubber I hinged at G.

J is the brake rod provided at its upper end with suitable mechanism, for forcing the brake block holder H against the roller.

K is the release spring.

L is the cross-bar on the frame F, which passes over the top of the brake block holder H, and lifts the roller from contact with the tire, by means of the release spring K, acting through the brake block holder H, when the pressure on the push rod J is released.

M is a bolt securing the rod J to the brake block holder H.

N is a jaw on the brake block holder H, used for making a pivoted connection between it and the rod J.

O, O are the rubber, or non-metallic outside covering or portions, of the roller D, so arranged to afford a much higher frictional resistance with the rubber of the bicycle tire than the harder and smoother central part P against which the brake block or rubber I is pressed.

In Fig. 4, Q is an arm extending out from the rear portion of the brake block holder H, provided with the jaw R, the object of this arm, being to convert the brake block holder H into a lever of the first order, and permitting the brake to be applied by pulling up, instead of pushing down as shown in Figs. 1, 2 and 3.

The operation of the brake is as follows: On downward pressure being applied through the rod J which is supplied with levers or suitable mechanism so that it can be operated at or near one end of the handle bars, the resistance of the spring K is overcome by the downward movement of the brake block holder H, removing the support underneath the cross-bar L, and permitting the roller D to come in contact with the tire A. The brake block I is then brought into contact with the middle portion of the roller D, checking its motion and retarding the velocity of the bicycle to any desired extent.

The operation of the modified form shown in Figs. 4 and 5 is exactly the reverse, it being adapted to bicycles in which the brake mechanism is arranged to pull up, instead of push down, the pull rod being attached to the rod Q and pivotally connected with the jaw R. Upon an upward pull being exerted, the brake block holder H at its forward end is depressed, removing its support from under the cross-bar L and permitting the roller D to come in contact with the tire A as before described. Where the periphery of the roller is all covered with, or made of the same material, so as to afford the same frictional resistance, for the part in contact with the tire and the part in contact with the brake block or rubber, it is found almost impossible to prevent the roller, (if arranged to give a large amount of braking force,) at times from being held fast or prevented from revolving and being worn out of round by the grit or dirt on the tire, which quickly destroys its value as a brake having no injurious effect on the tire.

What I do claim as my invention, and desire to secure by Letters Patent, is—

1. In a brake for bicycles, the combination of a roller or rollers; a roller frame F, the sides of which are united together by the cross bar L, and pivoted at one end between the front forks of the bicycle; a brake block holder H pivoted at one end to the roller frame and provided with means for connection to the push rod J; and a brake block or rubber attached to the brake block holder H, substantially as set forth.

2. In a brake for bicycles, the combination of a roller or rollers; a roller frame F pivoted at one end between the front forks of a bicycle; a brake block holder H pivoted at one end to the roller frame and provided with means for connection to the push rod J; a brake block or rubber attached to the brake block holder H; and the release spring K, substantially as set forth.

FRANCIS JOHN COLE.

Witnesses:
OLIVER C. CROMWELL,
ARTHUR E. COLE.